(12) United States Patent
Fabian et al.

(10) Patent No.: US 10,241,278 B2
(45) Date of Patent: Mar. 26, 2019

(54) HIGH DENSITY FIBER-OPTIC CONNECTOR

(71) Applicant: TE CONNECTIVITY CORPORATION, Berwyn, PA (US)

(72) Inventors: David James Fabian, Mount Joy, PA (US); James Patrick Mosier, Palmyra, PA (US)

(73) Assignee: TE CONNECTIVITY CORPORATION, Berwyn, PA (US)

( * ) Notice: Subject to any disclaimer, the term of this patent is extended or adjusted under 35 U.S.C. 154(b) by 0 days.

(21) Appl. No.: 15/377,695

(22) Filed: Dec. 13, 2016

(65) Prior Publication Data
US 2018/0164513 A1 Jun. 14, 2018

(51) Int. Cl.
*G02B 6/36* (2006.01)
*G02B 6/38* (2006.01)

(52) U.S. Cl.
CPC ........... *G02B 6/3874* (2013.01); *G02B 6/387* (2013.01); *G02B 6/3878* (2013.01); *G02B 6/3882* (2013.01); *G02B 6/3885* (2013.01)

(58) Field of Classification Search
USPC .............................................. 385/71, 76, 78
See application file for complete search history.

(56) References Cited

U.S. PATENT DOCUMENTS

| | | | |
|---|---|---|---|
| 4,875,755 A | 10/1989 | Borgos et al. | |
| 2002/0151207 A1* | 10/2002 | Bates, III | G02B 6/3878 439/364 |
| 2009/0103877 A1 | 4/2009 | Kluwe et al. | |
| 2009/0257722 A1 | 10/2009 | Fisher et al. | |
| 2013/0236142 A1* | 9/2013 | Fabian | G02B 6/3878 385/78 |
| 2014/0044395 A1* | 2/2014 | Waldron | G02B 6/38 385/60 |
| 2014/0308010 A1* | 10/2014 | Mougin | G02B 6/3825 385/76 |

FOREIGN PATENT DOCUMENTS

| | | |
|---|---|---|
| DE | 31 29 489 A1 | 2/1983 |
| EP | 2 637 049 A2 | 9/2013 |

OTHER PUBLICATIONS

International Search Report, Application No. PCT/IB2017/057611, International Filing Date, Dec. 4, 2017.

* cited by examiner

*Primary Examiner* — Eric Wong

(57) ABSTRACT

A connector sub-assembly comprising: (a) an insert housing defining two or more insert ferrule openings and at least two insert alignment pin openings, and having a mating surface; (b) a retainer attached to the insert and defining two or more retainer ferrule openings and at least two retainer alignment pin openings; (c) at least two alignment pins, each of the alignment pins disposed in one the insert alignment pin openings and in one of the retainer alignment pin openings, thereby aligning the insert ferrule openings and the retainer ferrule openings, the at least two alignment pins extending from the mating surface; and (d) only one fastener securing the insert and the retainer.

21 Claims, 4 Drawing Sheets

HIGH DENSITY FIBER-OPTIC CONNECTOR

FIELD OF INVENTION

In general, the invention relates generally to fiber-optic systems. More specifically, the invention relates to a high-density fiber-optic connector.

BACKGROUND

An optical fiber connector terminates the end of an optical fiber, and enables quicker connection and disconnection than splicing. The connectors mechanically couple and align the cores of fibers so light can pass. In fiber optic terminations, glass or plastic fibers are bonded to precision ferrule connectors ("FC"s), also described as fiber channel connectors, and polished for splitting or connecting two fibers together.

It is desirable to increase the bandwidth of a single FC by integrating as many fiber optic cables in the FC as possible. However, the ability to integrate a large number of fiber optic cables within a single FC is typically limited by the physical design structure of the FC.

Mechanical transfer ("MT") ferrules are particularly susceptible to this issue. An MT Ferrule is a multi-fiber ferrule in which fiber alignment is dependent on the eccentricity and pitch of the fiber and alignment pin holes. The alignment is dictated by the alignment pins during mating. The critical elements for fiber alignment are the ability to hold extreme tolerances for precision during the molding process and the shape, tolerances and material composition of the alignment pins.

In particular, in the VMEbus International Trade Association (VITA) 66.4 Fiber-Optic Connectors for use with MT Ferrules system, the ability to achieve a high bandwidth connection utilizing a large number of ferrules in parallel is constrained due to the physical structure of components in the system. This connector system has been designed for use as independent or stand-alone connectors in ANSI/VITA 48.1 (air-cooling applications) and ANSI/VITA 48.2 (conduction-cooling applications) applied to printed wiring boards (PWBs)/plug-in units defined in ANSI/VITA 46.0 VPX systems. Typical applications are in the aerospace and defense industry and include use in adverse environments for Embedded Computing, Processing, Avionics and Vetronics, Radar, Secure Communications and Imaging/Targeting.

The connector system provides a high-density, blind-mate optical interconnect in a backplane/card configuration. The fiber-optic (ribbon) cable interconnect is fed through the backplane to removable systems modules using MT ferrules. The connector system consists of a backplane connector and the mating module connector which interconnects a single ferrule, accommodating up to twelve fiber paths. The backplane connector is often referred to as a "receptacle" and the mating module connector a "plug". For purposes of the discussion herein, the terms receptacle and plug will be utilized. However, it will be understood that these are synonymous with backplane and module respectively. Furthermore, the term "connector" refers to either a receptacle or plug, unless otherwise noted.

FIG. 1 which is prior art shows an exploded view of a conventional receptacle (backplane) connector kit. The conventional receptacle (backplane) connector kit shown in FIG. 1, may be for example in accordance with the VMEbus International Trade Association ("VITA") Standard: "ANSI/VITA 66.4 Optical Interconnect on VPX—Half Width MT Variant". This connector system has been designed for use as independent or stand-alone connectors in ANSI/VITA 48.1 (air-cooling applications) and ANSI/VITA 48.2 (conduction-cooling applications) applied to printed wiring boards (PWBs)/plug-in units defined in ANSI/VITA 46.0 VPX systems.

Receptacle connector kit 100 further comprises receptacle shell 102, receptacle insert subassembly 116 and receptacle retainer subassembly 112.

Receptacle insert subassembly 116 further comprises insert housing 106, alignment pins 104(a) and 104(b) and retaining screws 114(a) and 114(b) corresponding respectively to alignment pins 104(a) and 104(b) and ferrule cavity 118, which will accommodate an MT ferrule 120.

Receptacle retainer subassembly 112 further comprises retainer plate 110 and captive screws 108(a)-108(b).

Retainer plate 110 is used to secure an MT ferrule 120 inside insert housing 106. Captive screws 108(a)-108(b) serve to secure retainer plate 110 of receptacle retainer subassembly 112 to receptacle insert subassembly 116. In particular, receptacle retainer subassembly 112 and receptacle insert subassembly 116, retainer plate 110 may be used to secure an MT ferrule 120.

Alignment pins 104(a) and 104(b) serve to align receptacle insert subassembly 116 and in particular insert housing 106 to facilitate efficient fiber mating. Captive screws 108(a)-108(b) also serve to align receptacle retainer subassembly 112 to receptacle insert subassembly 116, which is important for fiber mating. Retaining screws 114(a) and 114(b) serve to couple respective alignment pins 104(a)-104(b) to insert housing 106. Thus, alignment pins 104(a) and 104(b) must exhibit a minimum diameter to accommodate retaining screws 114(a) and 114(b). The required minimum diameters of alignment pins 104(a) and 104(b) and retaining screws 114(a) and 114(b) consumes space and therefore limits the capacity of receptacle (backplane) connector kit 100 to accommodate additional MT ferrules.

FIG. 1, which is prior art, also shows how an MT ferrule may be coupled to a conventional receptacle connector kit 100. In particular MT ferrule 120, which is coupled to cable assembly 122, is inserted into ferrule cavity 118 in receptacle insert subassembly 116. Receptacle retainer subassembly 112 and receptacle insert subassembly 116, retainer plate 110 may then be used to sandwich MT ferrule 120.

Applicants have identified significant shortcomings with conventional approaches for connecting fiber-optic cables and MT ferrules in particular. In this regard, with the existing VITA 66.1 and 66.4 industry-standard plug (daughtercard/module) connectors, it can be difficult or time consuming to remove or replace the installed MT ferrule(s). Current designs require either removing the connector from the board or removing a retainer plate, which may not be accessible. Removing an MT ferrule may be necessary if the ferrule mating face cannot readily be cleaned, or if the ferrule or terminated fiber optic cable assembly becomes damaged.

Similarly, the existing mating receptacle (backplane) connectors require accessibility behind the opposite side of the board to remove and replace installed MT ferrules. The standardized alignment pins (i.e., 104) of the existing VITA 66.1 and 66.4 connectors are oversize relative to the amount of blind-mating misalignment capability they provide. These oversize pins (and the respective mating cavities) may limit the number of MT ferrules the connectors can accommodate. The existing VITA 66.1 and 66.4 industry-standard connectors are spring-supported only within the plug connector. This may result in diminished optical performance including return loss compared to MTP/MPO connectors containing springs in both halves. In particular, MT ferrules having more than one row of physical-contact fibers (e.g., 2-row, 24-fiber ferrules) installed have a pronounced risk of poor or inconsistent return loss performance. The alternative is to restrict usage to single-row MT ferrules (typically 12 mating fibers) or lensed MT ferrules.

SUMMARY OF INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

Applicants recognize that the fasteners used to secure the ferrule retainer to the insert consume valuable space. Conventionally, the fasteners are used not only to connect the retainer to the insert, but also align the retainer with the insert. Consequently, more than one relatively thick fastener was typically required to both secure and align the retainer to the insert. However, Applicants also recognize that, rather than using the fasteners to provide the alignment function, alignment pins, which are already present to align mating connectors, may be modified to function also to align the retainer and insert. In other words, the alignment function conventionally served by the fasteners could be served instead by the alignment pins. The fastener therefore would only need to connect the retainer and the insert, not align them. This function can be easily served with just one fastener. Thus, in the connector of the present invention only one screw is used to attach the insert to the retainer, thereby leaving additional space in the insert for additional ferrule openings.

In one embodiment, the invention relates to a connector sub-assembly comprising: (a) an insert housing defining two or more insert ferrule openings and at least two insert alignment pin openings, and having a mating surface; (b) a retainer attached to the insert and defining two or more retainer ferrule openings and at least two retainer alignment pin openings; (c) at least two alignment pins, each of the alignment pins disposed in one of the insert alignment pin openings and in one of the retainer alignment pin openings, thereby aligning the insert ferrule openings and the retainer ferrule openings, the at least two alignment pins extending from the mating surface; and (d) only one fastener securing the insert and the retainer.

In another embodiment, the invention relates to a connector comprising: (a) a shell; (b) a connector sub-assembly disposed in the shell and comprising at least: (i) an insert housing defining two or more insert ferrule openings and at least two insert alignment pin openings, and having a mating surface; (ii) a retainer attached to the insert and defining two or more retainer ferrule openings and at least two retainer alignment pin openings; (iii) at least two alignment pins, each of the alignment pins disposed in one of the insert alignment pin openings and in one of the retainer alignment pin openings, thereby aligning the insert ferrule openings and the retainer ferrule openings, the at least two alignment pins extending from the mating surface; and (iv) only one fastener securing the insert and the retainer; and (c) two or more ferrules disposed at least partially in the insert ferrule openings and the retainer ferrule openings, the retainer configured to restrict movement of the ferrule away from the mating face.

In yet another embodiment, the invention relates to a connector kit of parts comprising: (a) a housing; (b) a connector sub-assembly configured for placement in the housing and comprising at least: (i) an insert defining two or more insert ferrule openings and at least two insert alignment pin openings, and having a mating surface; (ii) a retainer configured for attached to the insert and defining two or more retainer ferrule openings and at least two retainer alignment pin openings; (iii) at least two alignment pins, each of the alignment pins configured to be disposed in one of the insert alignment pin openings and in one of the retainer alignment pin openings, to thereby align the insert ferrule openings and the retainer ferrule openings, and to extend from the mating surface; and (iv) only one fastener configured to secure the insert and the retainer.

DETAILED DESCRIPTION

Figure 1:
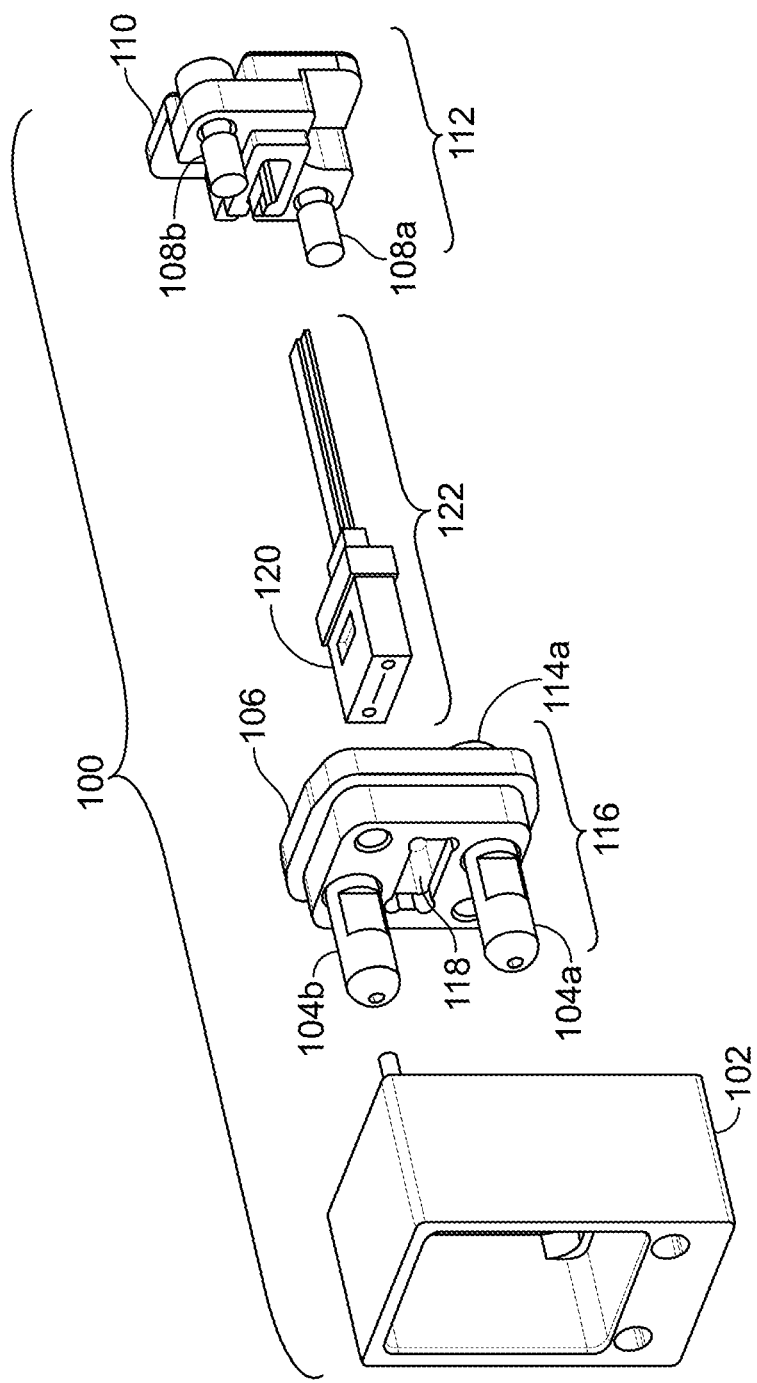
FIG. 1 is an exploded view of a prior-art single MT Ferrule connector.

Applicants have developed a novel receptacle connector kit and plug connector kit, which facilitate multiple ferrule connections, thereby increasing the bandwidth of data transmitted over fiber optic cables across the receptacle (backplane) connector and plug (module) connector. As used herein, the term "connector" refers to either a receptacle or plug, unless otherwise noted.

According to one embodiment, the receptacle connector kit utilizes a new type of connector alignment pin of a reduced diameter. These new alignment pins are press-fit into an insert housing in the receptacle. The alignment pins also protrude thru the opposite side of the housing. With this press-fit design, no additional space is required for screws to retain them in place, thereby reducing the required minimum diameter of the alignment pins, thus freeing up space for additional MT ferrules. According to this embodiment, the alignment pins serve a dual function in the receptacle of both (a) aligning a mating connector and; (b) positioning a retainer plate. In particular, because the alignment pins extend thru the insert housing, they serve to position the retainer plate for installation. Because the alignment pins serve to position the retainer plate, one of the captive screws required in conventional designs may be eliminated.

Thus, reducing the number of captive screws from two to one also frees up space allowing the accommodation of additional MT ferrules, thereby increasing bandwidth. Thus, in the receptacle, eliminating the two screws to secure the alignment pins and one of the two retainer screws to install the retainer plate provides the additional space to accommodate an additional MT ferrule.

Furthermore, according to one embodiment, the captive screw in the receptacle is installed from the connector mating face. In this embodiment the captive screw is oriented 180 degrees opposite compared with conventional designs. This is very convenient in the receptacle as a user does not have to go behind the receptacle to access the captive screw. Because the captive screw enters from front, a user is not burdened with employing an Allen key, which may interfere with components on the board.

According to one embodiment, the plug connector kit utilizes a new type of alignment pins that is press fit similar to the method utilized by the alignment pins in the receptacle. These alignment pins may also employ a reduced diameter because of the press fit design, reducing their required diameter. Similar to the function of the alignment pins in the plug, the alignment pins serve to align a retainer plate in the plug, thereby eliminating the necessity for a second captive screw as shown in conventional designs. Thus, similar to the receptacle, the plug employs only a single captive screw.

Similar to the receptacle, the single captive screw in the plug is also oriented 180 degrees opposite compared with prior designs. The captive screw is installed from the plug connector mating face, which also allows easy accessibility. Entering from the mating face, the single captive screw in the plug is reversed in orientation from conventional designs. As with the receptacle, because the captive screw enters from the front of the plug housing, a user is not burdened with employing an Allen key, which may interfere with components on the board.

With the new design, both the receptacle and plug utilize an oval spring in the installed spring enabled cable assemblies.

Figure 2A:
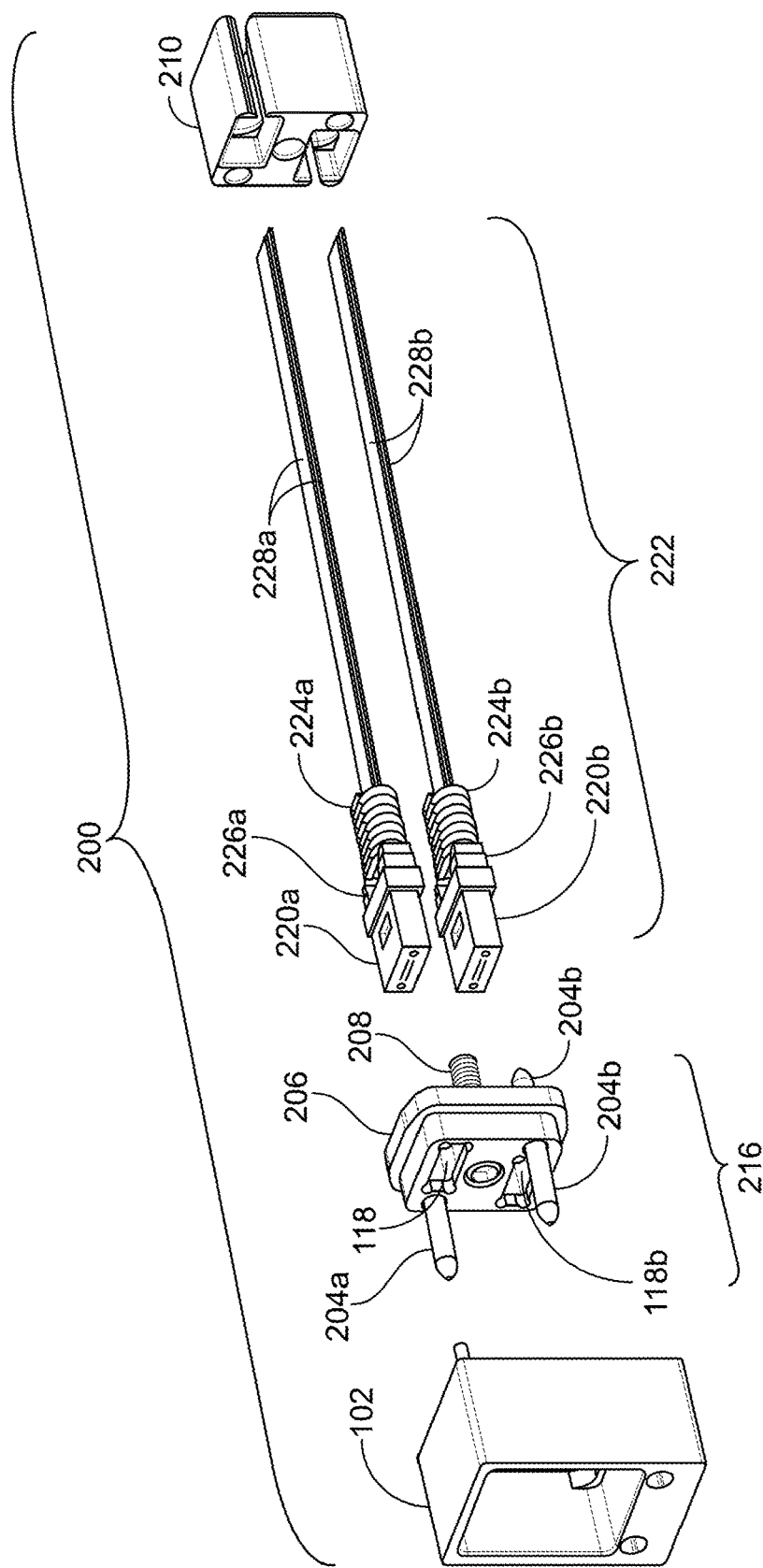
FIG. 2A shows an exploded view of one embodiment of a multi-ferrule receptacle connector system of the present invention.

FIG. 2A shows an exploded view of a receptacle connector kit according to one embodiment. Referring to FIG. 2A, receptacle connector kit 200 comprises the receptacle shell 102, receptacle insert subassembly 216, and receptacle retainer plate 210. Receptacle insert subassembly 216 comprises receptacle insert housing 206, captive screw 208, and press-fit alignment enabled posts 204(a) and 204(b). FIG. 2A also shows spring enabled cable assembly 222 which further comprises MT ferrules 220(a) and 220(b), oval springs 224(a) and 224(b), spring supports 226(a) and 226(b), and optical fibers 228(a) and 228(b). The optical fibers may be configured as a multi-fiber ribbon.

According to one embodiment, press-fit enabled alignment pins 204(a) and 204(b) are press-fit into the receptacle insert housing 206 in insert subassembly 216. Because a press-fit coupling scheme is utilized, the diameter of press-fit enabled alignment pins 204(a) and 204(b) may be narrower than typical alignment pins used in conventional designs as they do not need to accommodate mounting screws due to the press-fit design (see FIG. 1). This enables additional room to accommodate additional MT ferrules in receptacle connector kit 200. In particular, as shown in FIG. 2A, two MT ferrules rather than one can now be accommodated respectively in ferrule cavities 118(a) and 118(b) in receptacle insert subassembly 216. Thereby with this new design, the optical bandwidth may be increased.

Furthermore, with this new design press-fit enabled alignment pins 204(a) and 204(b) extend thru the receptacle insert housing 206 in receptacle insert subassembly 216 and thereby they serve to position and align receptacle retainer plate 210 for installation. With this press-fit design, no additional space is required for screws to retain them in place, thereby reducing the required minimum diameter of the alignment pins, thus freeing up space for additional MT ferrules. According to this embodiment, the alignment pins serve a dual function in the receptacle of both (a) aligning a mating connector and; (b) positioning a retainer plate. In particular, because the alignment pins extend thru the insert housing, they serve to position the retainer plate for installation.

Because the alignment pins serve to position the retainer plate, one of the captive screws required in conventional designs may be eliminated. Furthermore, captive screw 208 which utilizes an orientation 180° opposite to that of conventional designs. In particular, captive screw 208 enters from the mating face on receptacle connector kit 200. This is very convenient as the user does not have to go behind backplane to access the captive screw. Because the captive screw enters from front, a user is not burdened with employing an Allen key, which may interfere with components on the board.

Figure 2B:
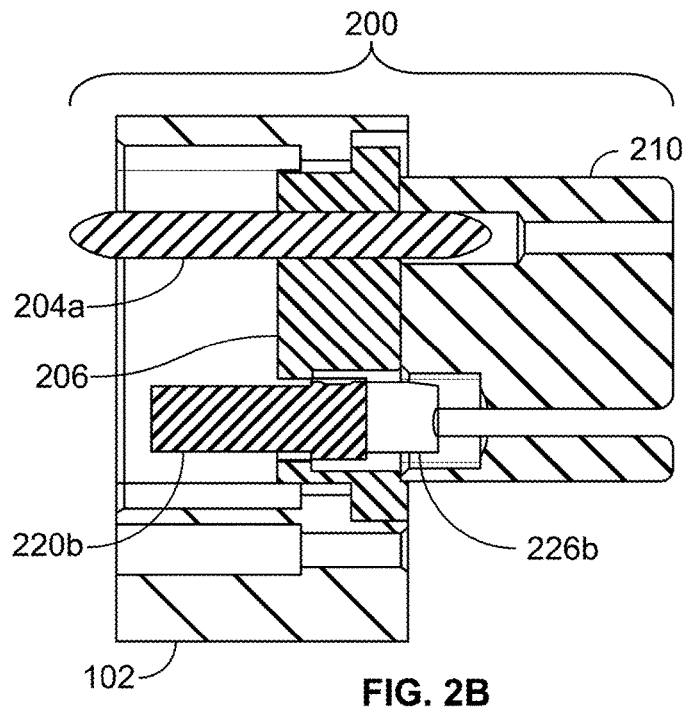
FIG. 2B shows a cross section of the assembled receptacle connector system of FIG. 2A.

FIG. 2B shows a cross section view of a receptacle connector kit according to one embodiment. Visible in the cross-section view of receptacle connector kit 200 are alignment pin 204(a), retainer plate 210, and insert housing 206. As shown in FIG. 2B, alignment pin 204(a) extends through insert housing 206 and serves to position retainer plate 210.

Figure 2C:
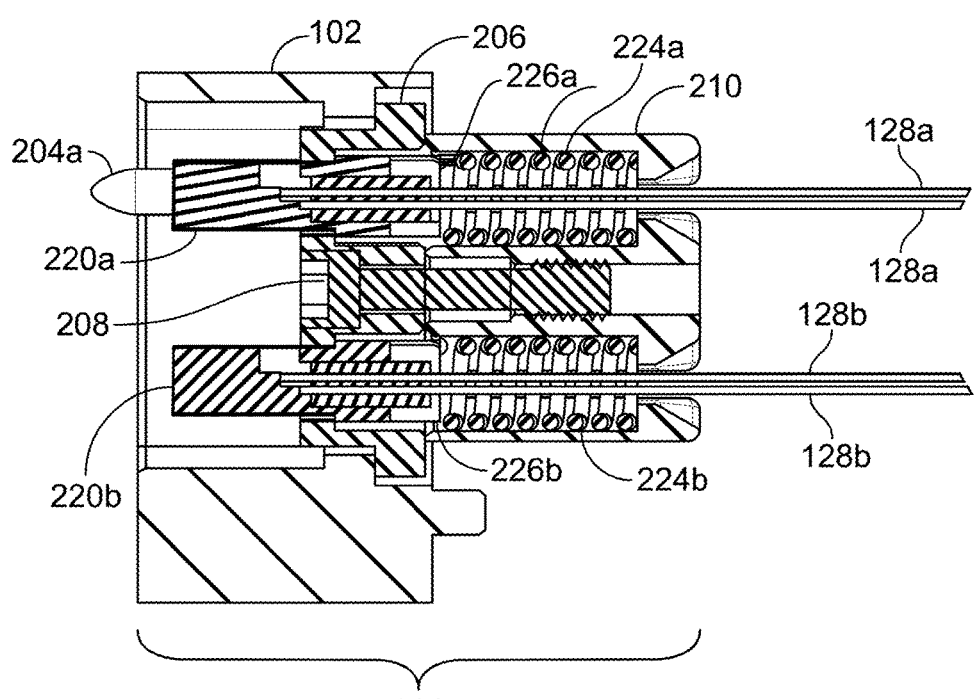
FIG. 2C shows another cross section of the assembled receptacle connector system of FIG. 2A.

FIG. 2C shows single captive screw 208 which extends through the receptacle insert housing 206 into receptacle retainer plate 210. The captive screw 208 is accessible from the mating face of receptacle connector kit 200 and therefore provides much easier accessibility than in conventional designs.

Figure 3:
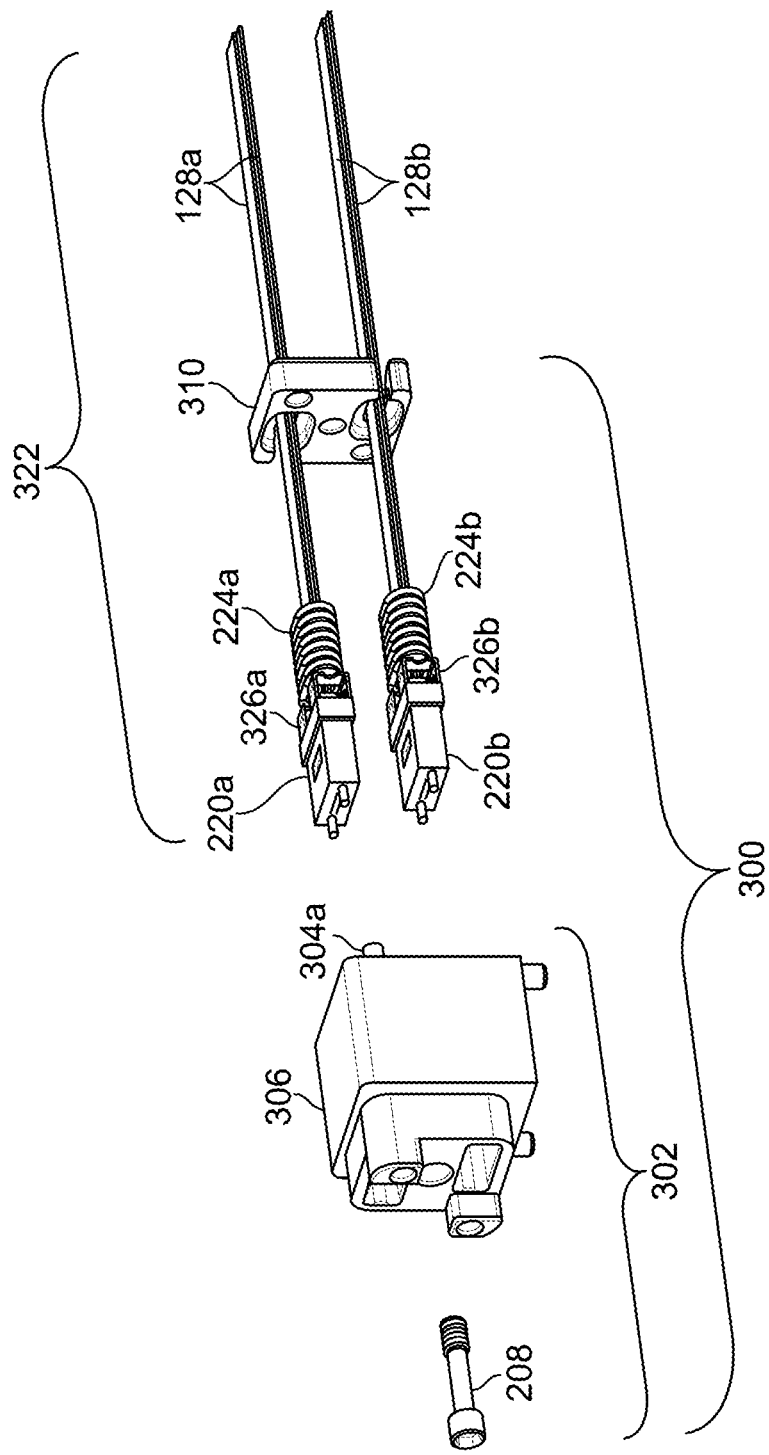
FIG. 3 shows a mating plug connector for use with the connector system of the present invention.

FIG. 3 is an exploded view of a plug connector kit according to one embodiment. Plug connector kit 300 further comprises plug housing subassembly 302 and plug retainer plate 310. Plug housing subassembly 302 further comprises plug housing 306, single captive screw 208, and alignment pins 304(a) and 304(b). FIG. 3 also shows spring enabled cable assembly 322 which further comprises to MT ferrules 220(a) and 220(b) and springs 224(a) and 224(b), pin holders 326(a) and 326(b), and optical fibers 228(a) and 228(b). The optical fibers may be configured as a multi-fiber ribbon.

These and other advantages may be realized in accordance with the specific embodiments described as well as other variations. It is to be understood that the above description is intended to be illustrative, and not restrictive. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" are used as the plain-English equivalents of the respective terms "comprising" and "wherein." Moreover, in the following claims, the terms "first," "second," and "third," etc. are used merely as labels, and are not intended to impose numerical requirements on their objects.

What is claimed is:

1. A connector sub-assembly comprising:
   an insert housing defining two or more insert ferrule openings, a first orifice for receiving a fastener, and at least two insert alignment pin openings, and having a mating surface;
   a retainer attached to the insert and defining two or more retainer ferrule openings, a second orifice for receiving a fastener, and at least two retainer alignment pin openings;
   at least two alignment pins, each of the alignment pins disposed in one of the insert alignment pin openings and in one of the retainer alignment pin openings, thereby aligning the insert ferrule openings and the retainer ferrule openings, the at least two alignment pins extending from the mating surface; and one and only one fastener disposed in said first and second orifices, thereby securing the insert to the retainer.

2. The connector sub-assembly of claim 1, wherein the fastener is a screw.

3. The connector sub-assembly of claim 1, wherein the alignment pins are press fit into the insert alignment pin holes.

4. The connector sub-assembly of claim 1, wherein the alignment pins are configured to be received in alignment pin holes of a mating connector to align said mating connector with the insert.

5. The connector sub-assembly of claim 1, wherein the insert ferrule openings and the retainer ferrule openings are configured to receive at least partially at least two multi-fiber fiber optic ferrules such that said ferrules are disposed between said insert housing and said retainer.

6. The connector sub-assembly of claim 5, wherein the retainer ferrule openings are configured to receive a spring rearward of each of the at least two multi-fiber fiber optic ferrules, such that the spring urges against the retainer and thereby urging the each of the at least two multi-fiber fiber optic ferrules forward in the insert.

7. The connector sub-assembly of claim 6, wherein the insert ferrule openings and the retainer ferrule openings are configured to receive two multi-fiber fiber optic ferrules.

8. A connector comprising:
a shell;
a connector sub-assembly disposed in the shell and comprising at least:
an insert housing defining two or more insert ferrule openings, at least two insert alignment pin openings, and one and only first orifice for receiving a fastener and having a mating surface;
a retainer attached to the insert and defining two or more retainer ferrule openings, at least two retainer alignment pin openings, and one and only second orifice for receiving said fastener;
at least two alignment pins, each of the alignment pins disposed in one the insert alignment pin openings and in one of the retainer alignment pin openings, thereby aligning the insert ferrule openings and the retainer ferrule openings, the at least two alignment pins extending from the mating surface; and
only one said fastener disposed in said first and second orifices, thereby securing the insert housing to the retainer; and
two or more ferrules disposed, at least partially in the insert ferrule openings and the retainer ferrule openings between said insert housing and said retainer, the retainer configured to restrict movement of the ferrule away from the mating face.

9. The connector of claim 8, wherein the fastener is a screw.

10. The connector of claim 9, wherein the mating surface is configured with a hole to receive the screw.

11. The connector of claim 10, wherein the hole is the center of the mating surface.

12. The connector of claim 8, wherein the alignment pins are press fit into the insert alignment pin holes.

13. The connector of claim 8, wherein the alignment pins are at least 1.0 mm in diameter and are no greater than 1.75 mm in diameter.

14. The connector of claim 8, wherein the alignment pins are configured to be received in alignment pin holes of a mating connector to align the mating connector with the connector.

15. The connector of claim 8, further comprising a spring for each of the at least two ferrules, and wherein the retainer ferrule openings are configured to receive the spring rearward of the each of the at least two ferrules, such that the spring urges against the retainer and thereby urging the each of the at least ferrules forward in the insert.

16. The connector of claim 15, wherein the spring is an oval in shape.

17. The connector of claim 8, wherein the insert ferrule openings and the retainer ferrule openings are configured to receive two multi-fiber fiber optic ferrules.

18. A connector kit comprising:
a shell;
a connector sub-assembly configured for placement in the shell and comprising at least:
an insert housing defining two or more insert ferrule openings, at least two insert alignment pin openings, and one and only first orifice for receiving a fastener, and having a mating surface;
a retainer configured for attachment to the insert and defining two or more retainer ferrule openings, at least two retainer alignment pin openings, and one and only second orifice for receiving said fastener;
at least two alignment pins, each of the alignment pins configured to be disposed in one the insert alignment pin openings and in one of the retainer alignment pin openings, to thereby align the insert ferrule openings and the retainer ferrule openings, and to extend from the mating surface; and
only one said fastener configured to be disposed in said first and second orifices to secure the insert to the retainer.

19. The connector sub-assembly of claim 1, wherein said insert housing further defines one and only first orifice for receiving said fastener, and wherein said retainer further defines one and only second orifice for receiving said fastener.

20. The connector sub-assembly of claim 19, wherein said first and second orifices are disposed in the center of said insert housing and retainer, respectively.

21. The connector sub-assembly of claim 19, further comprising at least one ferrule disposed between said insert housing and said retainer.

* * * * *